Patented Nov. 22, 1938

2,137,600

UNITED STATES PATENT OFFICE 2,137,600

METHOD OF REMOVING FLUORSPAR FROM ZINC CONCENTRATES

Frederick C. Abbott, Tulsa, Okla., Strathmore R. B. Cooke, Rolla, Mo., and Carl O. Anderson, Baxter Springs, Kans., assignors to Mahoning Mining Company, Youngstown, Ohio, a corporation of Delaware No Drawing. Application January 3, 1938, Serial No. 183,122

7 Claims. (Cl. 23—135)

Our invention relates primarily to a novel method of removing fluorspar and similar fluorine bearing materials from zinc concentrates obtained from zinc sulfide ores and is especially directed to the removal of such materials from zinc sulfide or sphalerite flotation concentrates to thereby condition them for smelting, the chamber and/or contact processes of sulfuric acid manufacture and the like for which they are generally deemed unsuitable when contaminated by the presence of fluorspar or fluorine-bearing materials in appreciable quantities.

These ores are widely distributed in nature and often contain in addition to sphalerite a number of other minerals such as galena, chert flint and other forms of silica, calcite and in certain cases calcium fluoride or fluorspar. Most of these minerals, except calcium fluoride, as well as others which are sometimes found in association with sphalerite, can be separated from the latter by flotation or other processes commonly in use either entirely or to such extent that the residue remaining in the sphalerite is not inimical to its further treatment in a commercial way by heating or roasting to recover its zinc content for the production of zinc oxides, metallic zinc and/or other zinciferous products and convert its sulfur content into gaseous oxides of sulfur, principally sulfur dioxide ($SO_2$), for use in sulfuric acid manufacture or for other purposes if desired.

However it has heretofore been considered commercially impracticable to remove fluorspar from zinc concentrates containing this material and the presence of more than a very slight trace of it is extremely inimical to the roasting furnaces and other elements subjected, during roasting of the concentrate, to contact by the fluorine-containing fumes given off through decomposition of the fluorspar and carried into the gaseous products evolved thereby, as these fumes vigorously attack such elements and correspondingly diminish their useful life, while their discharge into the atmosphere constitutes a serious menace to health and is prohibited by law in many communities. Moreover it is quite customary to operate sulfuric acid plants in association with zinc smelters but if the sulfur gas evolved during the smelting and then sent to the acid plant contains fluorine it must be freed therefrom by expensive washing operations before being used as the fluorine would otherwise rapidly destroy important components of the plant such as the acid chambers and/or catalysts.

Many purchasers of zinc sulfide concentrates have therefore established a definite policy of refusing to accept them when containing more than a few hundredths of 1% fluorine as calcium fluoride or fluorspar and the commercial exploitation of sphalerite ore deposits relatively high in zinc sulfide, but containing considerable amounts of fluorspar, has consequently been neglected.

In certain areas, particularly the vicinity of the Cave-In Rock district of southern Illinois, ores containing sphalerite in amounts up to about 20% with up to about 35% to 40% fluorspar occur in fairly large quantities, these ores also usually containing galena in amounts up to about 4% and varying amounts of calcite ($CaCO_3$) and silica ($SiO_2$), but hitherto because of the impossibility of freeing the zinc concentrates obtained from them from residual fluorspar or other fluorine-bearing constituents to the extent required by the operators of zinc smelters and/or sulfuric acid plants, the said concentrates are not acceptable to the trade; these and other fluoride bearing ores therefore have not been worked on a large scale and, in fact, hardly at all, and a commercially important field of zinc recovery has been necessarily neglected in consequence.

However, in accordance with our invention and at a cost which renders its practice commercially feasible, we can remove substantially all residual calcium fluoride from zinc sulfide concentrates.

It is therefore a principal object of our invention to provide an improved method of treating zinc concentrates containing fluorspar to remove the latter therefrom to a degree at least sufficient to enable the concentrate to be employed for commercial purposes for which a fluorine-containing concentrate is unsuitable.

Another object is to provide a method of decomposing the fluorspar contained in sphalerite flotation concentrates whereby the fluorine content thereof may be extracted without material loss of the zinc content.

A further object is the provision of a method of treating fluorspar-containing zinc concentrates by means of which the fluorine content can be removed without discharging fluorine and/or hydro-fluoric acid into the atmosphere in gaseous state or requiring the use of apparatus unsuited for contact with it.

A still further object is the provision of a method for extracting fluorine from zinc concentrates containing fluorspar or the like by a leaching operation during which the fluorine content of the concentrates is rendered soluble and is extracted without material loss of their zinc content.

Another object is the provision of a novel method of treating sphalerite concentrates with sulfuric acid at atmospheric temperatures to decompose fluorspar and like fluorides contained therein and render their fluorine content susceptible of removal by leaching or washing yet without decomposing or otherwise materially affecting the zinc sulfide in the concentrates.

Other objects, purposes and advantages of the invention will more fully appear or be understood from the following description of a preferred manner of practicing it which we consider well adapted for attaining its objects in the treatment of zinc concentrates derived from ores of the character of those occurring in the vicinity of the Cave-In Rock district of Illinois and similar fluorspar-bearing sphalerite concentrates which can readily be obtained by flotation from such ores in accordance with well known practices.

One ore of the character of those we consider well suited to treatment in accordance with our method contains about 3% lead, principally as galena (PbS), about 11% zinc principally as sphalerite (ZnS) and about 37% fluorspar ($CaF_2$), the remainder being primarily calcite ($CaCO_3$) and silica ($SiO_2$). The calcite and silica may be respectively present in amounts up to about 30% and about 40%, although when the calcite content is high, the silica is usually low and vice versa.

The galena and sphalerite may be readily separated by flotation from the calcite and/or silica in such an ore, preferably in accordance with any suitable method of selective flotation whereby they are removed separately. So far as we are aware, however, while these methods are satisfactory for separating the galena and sphalerite from calcite and silica, and from a large part of the fluorspar, none is capable of effecting a recovery of sphalerite from fluorspar bearing ore with sufficient selectivity to entirely exclude fluorspar from the concentrate.

Thus from an ore of the character mentioned it is possible to obtain by the use of suitable reagents, flotation concentrates containing about 64% of zinc, that is about 96% zinc sulfide, with not more than one tenth of one per cent lead sulfide and the remainder, in addition to fluorspar, principally silica and calcite; as a few per cent of the two latter substances is usually not inimical, such concentrates are, except for the fluorspar content, entirely satisfactory for smelting, sulfuric acid manufacture and other commercial purposes. But it is rarely, if ever, possible to obtain by flotation from spar bearing ore, zinc concentrates having materially less than 0.5% fluorspar while even with the most careful selection of reagents and operation of the process a fluorspar content of as high as 1% or more may sometimes be unavoidable, and most commercial users consider 0.5% to 1% fluorspar in zinc concentrates entirely too high. It is therefore evident that flotation concentration alone of fluorspar bearing ores is not a commercially practical method for the production of zinc concentrates intended for further treatment in the customary way, and as the fluorspar accompanies sphalerite in the concentrates not only by mechanical entrainment of particles in the froth but also by "locking" or physical adherence to some of the particles of sphalerite floated by the froth, it is evident that improvement of flotation processes would not remedy this situation.

We have discovered that while sulfuric acid in substantially all concentrations reacts with fluorspar to produce hydrofluoric acid and calcium sulfate and in high concentrations also reacts with sphalerite to produce zinc sulfate which, like hydrofluoric acid is soluble, this acid in concentrations of less than about 45% and at atmospheric temperatures does not attack sphalerite.

Our invention is based on this discovery and therefore in its practice we treat the zinc concentrate obtained by flotation or in any other suitable way and containing a small percentage of residual fluorspar, with sulfuric acid in such manner as to bring about a reaction between it and the fluorspar without causing a reaction between the acid and the sphalerite and thereby effect decomposition of the fluorspar and ultimately render its fluorine content soluble so it may be removed in solution by leaching without appreciably affecting the sphalerite.

Sphalerite flotation concentrate, after cleaning and filtering and prior to drying usually contains about 10% moisture and we preferably treat the moist concentrate without drying it by adding sulfuric acid at atmospheric temperature in sufficient quantity to produce about 11% to about 45% sulfuric acid strength in the fluid content of the mass, and after thoroughly mixing the acid and pulp allow the mass to stand for a considerable period, preferably at least twenty-four hours.

The acid initially attacks the calcite or calcium carbonate in the pulp, probably in accordance with the following reaction:

$$CaCO_3 + H_2SO_4 = CaSO_4 + H_2O + CO_2 \quad (1)$$

with the result that substantially as soon as the reaction begins $CO_2$ is evolved and passes off slowly in such a way as to enhance the fluidity of the mass and bring about a moderate ebullition which keeps the mass in motion substantially throughout the standing period and insures the completion of the acid-fluorspar reaction without the necessity for further stirring or other mechanical agitation.

As a result of the agitation induced by the $CO_2$, the acid can readily attack all the fluorspar content of the pulp in accordance with the following reaction:

$$H_2SO_4 + CaF_2 = CaSO_4 + 2HF \quad (2)$$

and the hydrofluoric acid evolved in this reaction, which is normally a gas but is readily soluble in water, immediately dissolves in the surrounding fluid and none of it passes off with the other gases evolved during the treatment.

However some of the hydrofluoric acid may under some conditions attack the sphalerite in accordance with the following reaction:

$$2HF + ZnS = ZnF_2 + H_2S \quad (3)$$

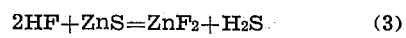

and the zinc fluoride produced in this reaction is soluble in water, as is the hydrogen sulfide ($H_2S$), some of which, however, may pass off as a gas.

But for attaining the object of the invention it is unnecessary for reaction (3) to proceed to completion since the fluorine may be removed as HF as readily as if all of it is in the form of $ZnF_2$. Consequently, after all or substantially all the fluorspar ($CaF_2$) has been decomposed in accordance with reaction (2) we mix water with the mass and then remove the fluids from the pulp by filtering and wash the solids with water to remove any undissolved soluble matter. The purified pulp or filter cake is then ready for drying preparatory to delivery to the smelters or elsewhere.

Suitable analysis demonstrates that the filtrate and wash water obtained from these operations contain substantially all the fluorine present in the original concentrate, and it is thus disposed of without being discharged into the atmosphere. As the residual calcium fluoride in the original concentrate usually amounts to not more than 1%, it is seldom that more than a small fraction of 1% of the zinc in the original concentrate is lost through reaction between the hydrofluoric acid and the zinc sulfide and as none of it is lost through reaction directly between the sulfuric acid and the sphalerite, the total zinc loss incident to the practice of our method is negligible.

Consequently we are able to produce purified zinc concentrate containing not more than a few hundredths of 1% of calcium fluoride or fluorspar and as fluorine constitutes but 48.7% of calcium fluoride, this fluorine content of the concentrate which is thus less than half of its fluorspar content is so low as to enable the concentrate to be used for substantially any purpose for which concentrates obtained from natural fluorspar-free sphalerite ores are adapted.

We have determined that the extent of removal of the fluorspar from the concentrates pursuant to our method is a direct function of the quantity of acid employed and the time allowed for its reaction. We therefore prefer in order to bring about the desired fluorspar removal without application of external heat in a reasonable time to utilize from 100 to 200 lbs. of acid per ton of dry concentrate as these quantities decompose a considerable portion of the fluorspar in a period of approximately twenty-four hours; of course, if a more complete removal is required, the acid may be maintained in contact with the concentrate for more extended periods such as forty-eight hours or even seventy-two hours or more.

Thus, for example, a zinc sulfide concentrate containing about 0.85% $CaF_2$ when treated with 100 lbs. of sulfuric acid per ton at atmospheric temperature for a period of twenty-four hours contained approximately 0.195% of fluorspar after being finally washed and when treated with a similar amount of acid for forty-eight and seventy-two hours respectively gave a final product containing only about 0.105% and 0.05% fluorspar. The same original concentrate when treated with 200 lbs. of acid per ton yielded a final product containing approximately 0.065% fluorspar after being treated for twenty-four hours, 0.02% after forty-eight hours and 0.005% after seventy-two hours.

It follows, that in accordance with our invention the fluorine content of the concentrate can be reduced to a mere trace or substantially eliminated if desired, or if a small quantity of fluorspar in the purified concentrate is acceptable, lesser amounts of acid and/or shorter periods of treatment may be sufficient.

We have herein described a preferred practice of our method particularly as it may be utilized in the treatment of fluorspar bearing sphalerite concentrates obtained by flotation from an ore of a certain class, as exemplified by ores found in one relatively restricted natural area, but it will be understood that the method may be employed as well in the purification of concentrates derived in any way and/or from ores of different specific characters and origins, and furthermore that changes and modifications in the several steps in our method, in the amounts of acid used, and the time allotted for treatment will under some circumstances be deemed advisable and may be made without departing from the spirit and scope of the invention as defined in the appended claims.

Having thus described our invention we claim and desire to protect by Letters Patent of the United States:

1. A method of substantially freeing zinc sulfide concentrates of a fluorine content of the order of 0.5% present principally as calcium fluoride which comprises subjecting the concentrate to the action of sulfuric acid in concentration below approximately 45% and in large excess of the molecularly equivalent amount required to decompose the calcium fluoride and other impurities present, maintaining the acid and concentrate in contact for a long period of time without application of external heat until substantially all the calcium fluoride is decomposed by the acid, then diluting the unconsumed acid and soluble reaction products with water, separating the fluid from the solids, and finally washing the latter.

2. In a method of substantially freeing zinc sulfide concentrates of a fluorine content not exceeding approximately 0.5% present principally as calcium fluoride, the steps of subjecting the concentrate to the action of sulfuric acid in concentration below approximately 45% and in an amount materially greater than the molecularly equivalent quantity required to decompose the calcium fluoride and other impurities present, maintaining the acid and concentrate in contact for a sufficiently long period of time to decompose substantially all the calcium fluoride, pulping the mass with water, and separating the fluid from the solids.

3. A method of substantially freeing zinc sulfide concentrates of a fluorine content of the order of about 0.5% which comprises subjecting the concentrate to the action of sulfuric acid in concentration below approximately 45% and in quantity from about 100 to about 200 pounds sulfuric acid per ton of dry concentrate, maintaining the acid and concentrate in contact for a long period of time until substantially all the fluorine bearing constituents are decomposed by the acid, then diluting the unconsumed acid and soluble reaction products with water, separating the fluid from the solids, and finally washing the latter.

4. A method of reducing the fluorine in zinc sulfide concentrates having a fluorine content of the order of approximately 0.5% which comprises subjecting the concentrate at atmospheric temperature to the action of sulfuric acid in concentration below approximately 45% and in amount materially greater than the molecularly equivalent quantity required to decompose the fluorine bearing constituents and other impurities present, maintaining the acid and concentrate in contact for a long period of time without application of external heat until substantially all the fluorine bearing constituents are decomposed by the acid, then diluting the unconsumed acid of soluble reaction products with water, separating the fluid from the solids, and finally washing the latter.

5. The method of reducing the fluorine in zinc sulfide concentrates containing approximately 0.5% fluorine, principally combined in a water insoluble fluoride, which comprises subjecting the concentrates to the action of sulfuric acid in concentration below approximately 45% and in large excess of the molecularly equivalent amount required to decompose the insoluble fluoride and other impurities present, maintaining the acid and concentrate in contact for a protracted period of time to thereby convert the insoluble fluoride to a water soluble fluoride, then while maintaining said soluble fluoride in solution, washing it from the solids with water.

6. The method of removing fluorine from calcium fluoride present in zinc sulfide concentrates in quauntity of the order of 1% which comprises subjecting the concentrates to the action of sulfuric acid in concentration below approximately 45% and in quantity materially greater than that molecularly equivalent to the constituents of the concentrates susceptible to reaction therewith for a period of time in excess of approximately 24 hours to thereby release the fluorine from the calcium fluoride, and then while maintaining said fluorine in water soluble state washing it from the solid concentrates.

7. The method of reducing the fluorine content of a zinc sulfide concentrate to less than 0.05% in the final product which comprises subjecting the concentrate to the action of sulfuric acid in concentration below approximately 45% and in an amount materially greater than the molecularly equivalent quantity required to decompose the fluorine bearing constituents and other impurities present, maintaining the acid and concentrate in contact for a long period of time until suubstantially all the fluorine bearing constituents are decomposed by the acid, then pulping the mass with water, separating the fluid from the solids, and finally washing the latter.

FREDERICK C. ABBOTT.
STRATHMORE R. B. COOKE.
CARL O. ANDERSON.